(12) United States Patent
Begen

(10) Patent No.: US 8,768,858 B1
(45) Date of Patent: Jul. 1, 2014

(54) SYSTEMS AND METHODS FOR APPLYING POSTAL RATE DISCOUNTS

(75) Inventor: Geoffrey C. Begen, Lake Forest, CA (US)

(73) Assignee: Stamps com Inc., El Segundo, CA (US)

( * ) Notice: Subject to any disclaimer, the term of this patent is extended or adjusted under 35 U.S.C. 154(b) by 719 days.

(21) Appl. No.: 12/651,320

(22) Filed: Dec. 31, 2009

(51) Int. Cl.
*G06Q 30/00* (2012.01)
*G06Q 10/08* (2012.01)
*G06Q 30/02* (2012.01)

(52) U.S. Cl.
CPC ...... *G06Q 10/08345* (2013.01); *G06Q 10/0838* (2013.01); *G06Q 30/02* (2013.01)
USPC ...................................................... 705/335

(58) Field of Classification Search
CPC ................. G06Q 10/08345; G06Q 10/0838; G06Q 30/02
USPC ................................................ 705/402, 335
See application file for complete search history.

(56) References Cited

U.S. PATENT DOCUMENTS

| | | | |
|---|---|---|---|
| 2002/0070149 A1* | 6/2002 | Schererz et al. | 209/540 |
| 2007/0073587 A1* | 3/2007 | Walker et al. | 705/14 |
| 2007/0179853 A1* | 8/2007 | Feige et al. | 705/14 |
| 2010/0312627 A1* | 12/2010 | Khechef et al. | 705/14.17 |

OTHER PUBLICATIONS

U.S. Appl. No. 11/323,462, Leon et al.
U.S. Appl. No. 11/323,463, Leon et al.
U.S. Appl. No. 11/353,690, Kara.
U.S. Appl. No. 12/103,496, Bortnak et al.
U.S. Appl. No. 12/553,824, Bortnak et al.

* cited by examiner

*Primary Examiner* — Allen J Jung
(74) *Attorney, Agent, or Firm* — Fulbright & Jaworski LLP

(57) ABSTRACT

Embodiments described herein provide a shipper a discount for each postal item that is mailed by a delivery service provider. A facilitator offers the shipper an immediate discount that is based on the shipper meeting certain requirements, e.g. purchasing a certain amount of postage value, shipping a certain number of mail items, and/or shipping a certain type of mail item such as a qualified mail piece. The facilitator will receive a rebate from the delivery service provider based on the shipper ability to meet the established requirements.

19 Claims, 10 Drawing Sheets

1100

```
# ITEMS SHIPPED
DURING TIME PERIOD
$ COST OF ITEMS
$ AMOUNT SUM
```

```
# ITEMS SHIPPED
DURING TIME PERIOD
% CURRENT DISCOUNT LEVEL
# ITEMS TO SHIP TO NEXT
DISCOUNT LEVEL
$ SAVING OF NEXT
LEVEL AMOUNT
```

```
$ SAVING ON UNIT A
$ SAVING ON UNIT B
$ SAVING ON UNIT C
        ⋮
```

```
$ SAVING ON CLIENT A
$ SAVING ON CLIENT B
$ SAVING ON CLIENT C
        ⋮
```

FIG. 14

SYSTEMS AND METHODS FOR APPLYING POSTAL RATE DISCOUNTS

CROSS-REFERENCE TO RELATED APPLICATIONS

This application is related to co-pending and commonly assigned U.S. patent application Ser. No. 08/725,119 entitled "SYSTEM AND METHOD FOR REMOTE POSTAGE METERING," filed Oct. 2, 1996, issued as U.S. Pat. No. 5,822,739 on Oct. 13, 1998; U.S. patent Ser. No. 09/115,532 entitled "SYSTEM AND METHOD FOR REMOTE POSTAGE METERING," filed Jul. 15, 1998, issued as U.S. Pat. No. 6,249,777 on Jun. 19, 2001; U.S. patent Ser. No. 09/644,632 entitled "VIRTUAL SECURITY DEVICE," filed Aug. 23, 2000, issued as U.S. Pat. No. 6,889,214 on May 3, 2005; U.S. patent Ser. No. 10/862,058 entitled "VIRTUAL SECURITY DEVICE," filed Jun. 4, 2004, and published as US 2005/0256811 on Nov. 17, 2005; U.S. patent Ser. No. 11/353,690 entitled "SYSTEM AND METHOD FOR VALIDATING POSTAGE," filed Feb. 14, 2006; U.S. patent Ser. No. 12/103,496 entitled "SYSTEMS AND METHODS FOR ACTIVATION OF POSTAGE INDICIA AT POINT OF SALE," filed Apr. 15, 2008; and U.S. patent Ser. No. 12/553,824 entitled "SYSTEMS AND METHODS FOR PAYMENT OF POSTAGE INDICIA AT OR AFTER POINT OF MAILING;" U.S. patent Ser. No. 11/323,462, entitled "HIGH SPEED PRINTING," filed Dec. 30, 2005; U.S. patent Ser. No. 11/323,463, entitled "SYSTEMS AND METHODS FOR SINGLE PASS PRINTING POSTAGE INDICIA," filed Dec. 30, 2005, the disclosures of which are hereby incorporated herein by reference.

TECHNICAL FIELD

The present invention relates to payment for postage and, more particularly, to providing a discount to postal rates.

BACKGROUND OF THE INVENTION

The use of postage indicia in place of traditional postage stamps has become widespread. For example, solutions for generating and printing valid postage indicia using a home or office processor-based system, such as a personal computer, have been provided by Stamps.com Inc., Los Angeles, Calif. (the assignee of the present application) for a number of years. The postage indicia generated by such processor-based systems has typically been an information based indicia (IBI), wherein a barcode (e.g., two-dimensional barcode) carries computer readable information useful for validating the indicia when placed in the mail stream.

Typically, the user prepays a particular amount into an account, and postage is deducted from the account during the creation of the indicia. The user is charged the full amount for each indicium that is created. Each postal item mailed by a user may have the same or different postage costs associated with the postal item as compared with other postal items. For example, items mailed using first class service cost more than items mailed using third class service. Heavier postal items cost more than lighter postal items. Postal items being sent to more distant locations may cost more than those being sent to closer destinations. Larger packages cost more than smaller packages. In any event, for each postal item being mailed, the user does not receive a discount on the postage required for the item. If the user desires to have lower costs, then the user must change the size, weight, and/or service level (e.g. from first class to third class) of the item being mailed.

BRIEF SUMMARY OF THE INVENTION

Embodiments of the invention are directed to systems, methods, and apparatuses, which use rebate programs or other incentives offered from delivery service providers to provide discounts to shippers. According to embodiments of the invention, three parties may be involved in the embodiments' systems, methods, and apparatuses including a shipper (e.g. a person mailing a mail piece), a facilitator (e.g. the entity from which the shipper obtains postage indicia such as Stamps.com), and a delivery service provider (e.g. the United States Post Office, FedEx, UPS, etc.) In embodiments, a delivery service provider may offer one or more rebate programs that provide a rebate to shippers who ship at least a threshold number of mail items, obtain at least a threshold amount of postage value during a set time period, and/or ship mail qualified mail pieces. Thus, if the shipper meets the requirements, the shipper could obtain a rebate. However, obtaining such a rebate may require the shipper to fill out paper work to apply for the rebate, and if approved, the delivery service provider could send the shipper a rebate check for the postage value purchased during that period. For example, a rebate program may offer a 10% rebate on all postage value purchased in a year if the shipper purchases $10,000 worth of postage value. If during that year the shipper purchased $10,000 worth of postage value, the shipper could apply for the rebate, and if approved, the delivery service provider could send a rebate of $1,000 to the shipper.

Embodiments provide an immediate discount to shippers on the cost of obtained postage indicium. As used herein, a discount rate is a reduced rate that the user is charged for a postage indicium. For example, if the normal rate charged to most shippers for a first class, 1 ounce, postage indicium is 42 cents, a shipper purchasing postage indicium at a discount rate could purchase the same postage indicium at a reduced rate, such as 39 cents.

As used herein, a discount is different from a rebate. Specifically, a discount will be perceived by the shipper to cause an immediate cost savings or a cost savings realized in a single transaction as perceived by the shipper as apposed to a separate and/or typically lengthy rebate process. For example, a shipper obtaining a postage indicium at a discount rate may have only that discounted rate withdrawn from their account. That is, if the shipper purchases a postage indicium at the discount rate of 39 cents, then 39 cents is debited from their account. In another embodiment, the discount rate may be formed by withdrawing the normal rate from the shipper's account and then immediately (as perceived by the shipper) refunding a portion of the full rate to the account thereby forming the discount. For example, if the normal rate for a certain postage indicium is 42 cents and the shipper purchases a postage indicium at a discount rate of 39 cents, then 42 cents is debited from the shipper's account, and in the same purchase transaction (as perceived by the shipper) 3 cents is refunded to the account effectively causing the shipper to pay only the discounted rate for the postage indicium. As a result, regardless of the method used, the discount amount is guaranteed, and the shipper perceives the discount rate as being received immediately or in a single transaction thereby causing immediate savings.

In contrast, as used herein, a rebate is not perceived by the shipper as causing an immediate savings or as being conducted in a single transaction. As explained above, a rebate would be received in a separate transaction, as perceived by the shipper, and may never occur at all. For example, under a rebate program a shipper may purchase a postage indicium and pay the normal rate for the postage indicium. Thereafter, if the shipper qualifies for the rebate, the shipper could apply for the rebate and be provided a remittance for the rebate amount for which the shipper qualified.

Embodiments of the invention provide multiple discount programs for which a shipper may qualify. For example, the discount programs could be based on the volume of shipments, the amount of postage value purchased, and/or the type of mail piece shipped. For example, a facilitator could offer a discount program that is based on the expected postage value that the shipper will obtain over a time period. In an exemplary embodiment, based on prior usage history, a shipper is expected to obtain $10,000 in postage value in a one year period; thus, if desired, the facilitator could offer the shipper postage indicia at a discount rate (e.g. 2 cents per postage indicium or 1% discount off of acquired postage value) to encourage the shipper to purchase postage indicia from that facilitator. Additionally or alternatively, the facilitator could offer a discount based on the mail item that will be shipped. For example, the facilitator could offer the shipper postage indicia at a discount rate (e.g. 2 cents for postage indicium or a percent discount per item) for each mail item shipped that qualifies as a qualified mail piece (e.g. a mail item that comprises a computer generated information based indicium, a cleansed address, and an intelligent barcode). Additionally or alternative, the facilitator could create and offer a shipper or group of shippers customized rate tables, such as to provide rate tables having customized rates based on that shipper or shippers postal usage.

Thereafter, the facilitator, on behalf of the shipper, could apply for the rebate from the delivery service provider once the shipper's activities meet the requirements for the rebate. Accordingly, when the facilitator receives the rebate, the facilitator recoups the discount provided to the shipper. As such, the shipper receives a discount immediately and the facilitator receives the rebate at a later date. Embodiments operate to provide the discount to the shipper prior to the shipper actually qualifying for a rebate under a rebate program, while other embodiments operate to provide the discount to the shipper only after the shipper otherwise qualifies for the underlying rebate.

Embodiments of the invention provide discount programs with multiple tiers. For example, a volume based discount programs could provide varying discount rates based on volume related metrics. In an exemplary embodiment of such a volume based program, a shipper may qualify for a first discount (e.g. 1 cent per postage indicium) for the first 1500 items shipped, a different discount (e.g. 2 cents per postage indicium) for the next 1500 items shipped, a different discount (e.g. 3 cents per postage indicium) for the next 1500, etc. Of course any variation of discounts and metrics could be used in a discount program.

Embodiments of the invention provide discount rates to a shipper who, on his own, would not qualify for a delivery service provider's rebate, such as a shipper who does not purchase enough postage indicia during a certain time period to directly qualify for a delivery service provider's rebate. Embodiments allow a facilitator to aggregate a plurality of shippers and offer a discount rate to the plurality of shippers. That discount could be based on the amount of postage value the aggregate of shippers are expected to obtain over a period of time, for example. Additionally or alternatively, the discount rate could be based on the number of postage indicia the aggregate of shippers are expected to obtain over a period of time or the type of mail item shipped. The facilitator could then receive the rebate based on the postage purchased or used by the aggregated shippers.

According to one embodiment, the immediate discount offered to shippers by the facilitator is in total, less that the rebate offered by the delivery service provider. Additionally, or alternatively, the facilitator could charge a service fee for providing the immediate discount and/or allowing the shipper to participate in the program (e.g. per use, per login, a monthly service fee, a one time membership fee, etc.). Such an embodiment aids in the allocation of risk and for provide payment to the facilitator for the discount service.

Embodiments provide the shipper with an interactive graphic user interface (GUI), wherein the displayable information informs the shipper about discount programs and/or discount rates and allows the shipper to select and sign up for a discount program. Embodiments track a shipper's activities and display information about postal usage, purchases, and discounts. Additionally or alternatively, the shipper could interact with the GUI to calculate expected savings based one or more discount program, to forecast possible savings, and identify various shipping strategies that could achieve various forecasted savings.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIG. 11 depicts an example of information displayed to a shipper, according to embodiments of the invention;

FIG. 12 depicts another example of information displayed to a shipper, according to embodiments of the invention;

FIG. 13 depicts a further example of information displayed to a shipper, according to embodiments of the invention;

FIG. 14 depicts a still further example of information displayed to a shipper, according to embodiments of the invention;

DETAILED DESCRIPTION OF THE INVENTION

Figure 1:
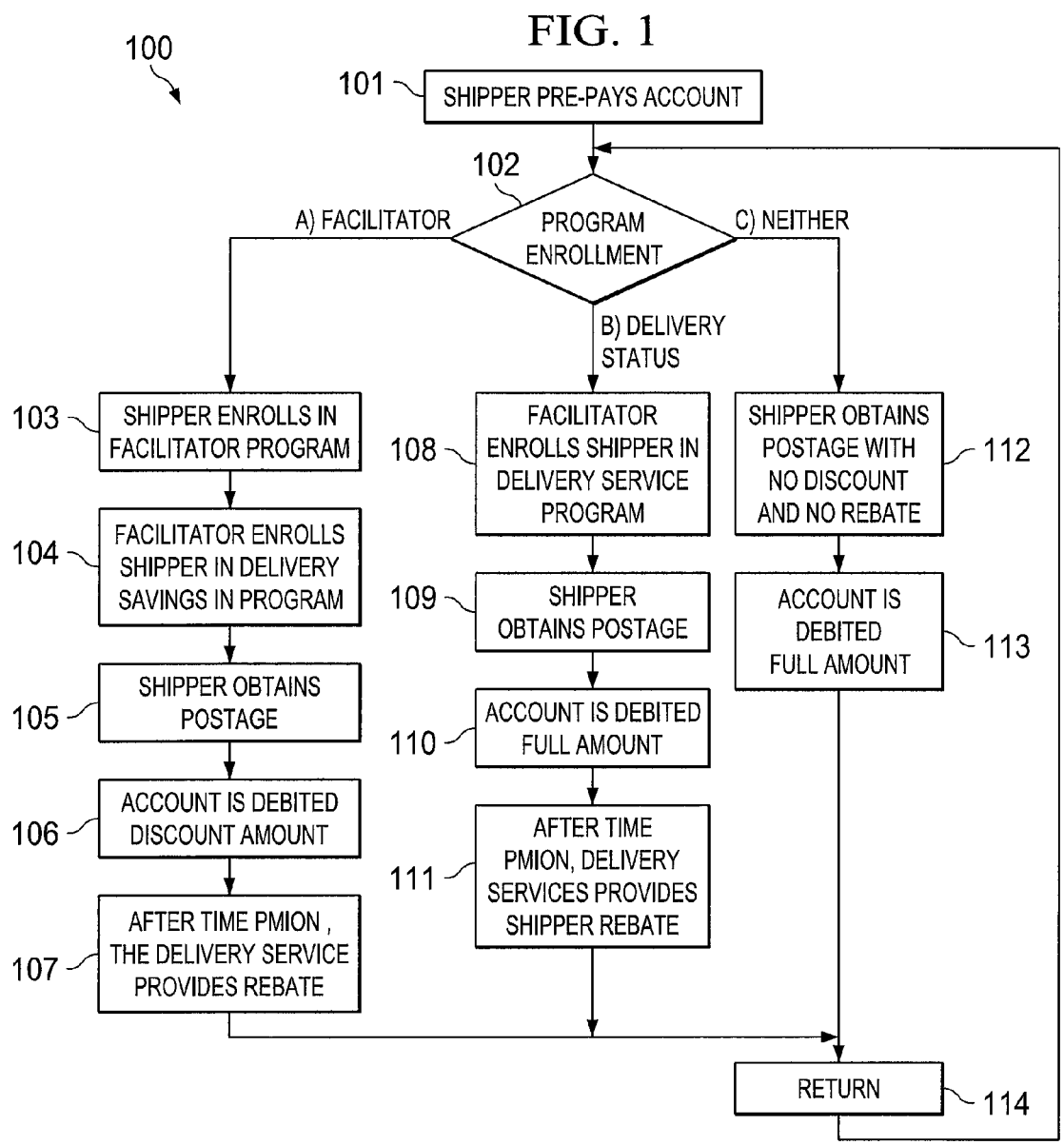
FIG. 1 depicts an exemplary process that provides a discount to a shipper, according to embodiments of the invention.

FIG. 1 depicts an exemplary process 100 that provides a discount to a shipper. The illustrated process 100 involves interaction between three entities, namely 1) a user or shipper, which is the entity that is mailing a postal item; 2) a delivery service provider, which is the entity (e.g. the USPS) that receives the postal item from the shipper and delivers the postal item to a recipient; and 3) the facilitator, which is the entity (e.g. Stamps.com) that is involved with financial transactions between the shipper and the delivery service provider. The facilitator may also be involved with other aspects of mail handling, for example, the facilitator may be authorized by the delivery service provider to enable the shipper to print postage indicia or otherwise obtain postage indicia and/or stamps.

In this process 100, the delivery service provider is offering a rebate to the shipper. In this program, the delivery service provider rebates a portion of the money spent for postage for prior mailings of postal items. For the shipper to qualify, the shipper may be required to exceed a particular threshold associated with the mailings over a particular time period. The threshold may be for a cost of the mailings during the time period, or for a number of packages mailed during the time period, or may be for some other postal criteria. In any event, the delivery service provider is offering a rebate based on prior delivery service provider usage.

Also in this process 100, the facilitator is offering a discount program to the shipper. In this program, the facilitator offers a discount on the postage to the shipper. The discount may be implemented in different ways. In one way, the shipper is charged a discounted amount for the postage instead of the full postage amount. For example, if the shipper is mailing a letter-sized envelope weighing 1 ounce to a domestic recipient using first class service in the U.S., the normal postal charge (e.g. full price) could be $0.42. Under the discount program, the shipper may only be charged a percentage of the full price, e.g. 90% or $0.38. In another way, the shipper could be charged the full amount and then refunded the discount portion. Using the aforementioned example, the shipper is charged $0.42 and then is refunded $0.04. Note that the refund may be provided immediately after the debiting of the full amount. Immediately implies that it appears to the shipper as if only the discounted amount has been debited from the account. Thus, the time period involved in immediately refunding the discount portion includes from zero (e.g. simultaneous) to a reasonable computer processing time and/or data transmission time that allows a computer to receive data and recognize that a postage charge has accrued and then refund the discount amount. Such reasonable time may be a few minutes depending on the distances between the computers involved. In any event, the time period for the refund is less than the time period for payment from the delivery service provider rebate program. In one embodiment, the value back to the shipper offered by the immediate discount program is in total, less than value back offered by the rebate program. In other embodiments, the value of the discount program may be the same or more than the value of the rebate program.

The facilitator may offer participation in the discount program to all or most shippers that are clients of their services. The facilitator may offer participation in the discount program only to certain clients, for example, client shippers that have an established a shipping history that consistently meets the requirements of the delivery service provider rebate program. Thus, the facilitator can reasonably extrapolate that such client shippers will continue to meet the requirements. Alternatively, client shippers that are new or do not consistently meet the requirements of the rebate program may be offered a discount program with a less favorable discount rate. Once a history has been established and the new clients consistently meet the requirements of a rebate program, then they may be offered a discount program with more favorable terms. As another embodiment, new shippers may be offered more favorable terms as an enticement to become a client of the facilitator. As another alternative, client shippers that are new or do not consistently meet the requirements of the rebate program may sign a contract agreeing that they will meet the requirements or refund all or part of the discount that they receive.

The process 100 begins with block 101, where the shipper prepays an account. The account may be maintained on a computer or server that is under control of the shipper or may reside in a server that is under control of the facilitator. The account may comprise a postage meter. In optional diamond 102, A) the shipper may enter the immediate discount program of the facilitator, B) the shipper may elect to enter the rebate program of the delivery service provider, or C) the shipper may not elect any discount program. Note that diamond 102 may operate prior to, subsequent from, or contemporaneous with box 101.

Path A is entered if the shipper elects to enter one of the facilitator's discount program. The process 100 then proceeds to block 103, program enrollment. In this block, the shipper agrees to the terms of the facilitator's program. Such terms may include a required time of participation, agreement to use the specified delivery service provider for all or substantially all mailing needs, agreement to mail a predetermined number of items, agreement to mail a number of items that require a predetermined postal value, etc. Also, in embodiments the shipper agrees to be enrolled into the rebate program of the delivery service provider, and designate the facilitator as the rebate fund receiver.

In block 104, the facilitator enrolls the shipper into the rebate program of the delivery service provider using the information obtained in block 103. The facilitator is designated as the rebate fund receiver for the mailings of the shipper.

Note that blocks 105, 106, and 107 may be considered separate from the registration portion of blocks 103, 104. Blocks 105 and 106 repeat multiple times, and block 107 occurs on a periodic basis, whereas blocks 103 and 104 may only occur once. There may also be a time period gap between the operation of block 104 and 105, for example, there may be a threshold that must be reached before the discount program becomes active. Thus, a shipper may sign up for the program, but discounts may not apply for some time.

In block 105, the shipper obtains one of a postage indicium, a stamp, or other postal indicator of value for a postal item that is to be mailed via the delivery service provider. For example, the shipper may print a postage indicium from their server or computer. The postage indicium may be created by the shipper's server or by the facilitator's server. In any event, the shipper obtains an postage indicium or other indicator of postage value and attaches or associates the postage indicium with the postal item that is to be mailed. The shipper then provides the postal item to the delivery service provider, which in turn processes the item, and delivers the item to the designated recipient.

In block 106, the shipper's account is debited for a discount rate for the postage obtained in block 105. The payment may occur during or subsequent to the operation of block 105. In other words, the account may be debited during obtainment of the postage indicium, e.g. during creation of the postage indicium. Alternatively, the account may be debited during handling of the postal item by the delivery service provider, e.g. after scanning by the delivery service provider. Alternatively still, the account may be debited at a set time (e.g. at the end of the day, end of a billing cycle, etc.). In any event, the account is debited for a discount amount of the value of the postage.

The account may be debited in different ways. One way is to charge the shipper a discounted amount for the postage instead of the full postage amount, as described above. Thus, instead of debiting the account for the full postage charge, the account is charged a discounted rate. Another way is to charge the account of the shipper the full amount and then refund the discount portion. This way may be used if the delivery service provider requires that the full amount be debited from the account. As stated above, the refund may occur substantially simultaneous with the debiting or may occur after a predetermined time period. In embodiments, the account is debited at the time indicia are obtained. Alternatively, the account could be debited at some time after the postage is obtained, for example, at the time when the mail item enters the delivery stream or at the time the mail item is delivered to the destination.

The facilitator tracks the postal usage of the shipper. The facilitator can track information on an item by item basis. For example, the facilitator can track the number of items shipped, the postage charged for each item, the class of service for each item, destination of each item, the number of mail items which never reach their final destination, the reason a mail item never reached its final destination (e.g. insufficient postage, erroneous address, unreadable information, etc.). The tracked information can be analyzed by the facilitator (or another entity e.g. the delivery service provider or a third party) and statistical information can be formulated (e.g. ration comparing deliverable and non-deliverable mail pieces).

Blocks 105 and 106 repeat many times as the shipper sends postal items. In block 107, after the time period of the delivery service program, the delivery service provides the rebate to the facilitator for the items mailed by the shipper. In order to receive the rebate, the facilitator may have to apply for the rebate, such application may include the information that the facilitator tracks during the obtainment and payment of postage in blocks 105 and 106, as well as other forms and/or information.

The discount program may have an ending period, or it may allow the shipper to leave the program at any time. In any event, after the time period of the facilitator discount program, the process moves to block 114, and returns to diamond 102, where the shipper may then select a desired program, e.g. the facilitator may elect to continue in the discount program.

Note that the discount amount is selected by the facilitator, and the rebate amount is selected by the delivery service provider. As stated earlier, the aggregate of the discounts may be less in value than the rebate amount. The discount amount is selected by the facilitator and may be based on the rebate being offered by the delivery service provider, the cost of administrating the discount program, risk associated for the individual shipper not meeting the rebate requirements of the delivery service provider, and/or risk associated for a group of shippers not meeting the rebate requirements of the delivery service provider. Moreover, the facilitator could charge a service-fee or a membership-fee to the shipper for being a member of a discount program. In embodiments, a discount program could be set up such that the aggregate of discounts may be the same or more than the value of the rebate amount and the membership-fee is larger as a result.

Path B of the process 100 is entered, if the shipper elects to enter the delivery service provider's rebate program. The process 100 then proceeds to block 108. In block 108, the facilitator enrolls the shipper into the rebate program of the delivery service provider using the information provided by the shipper. The shipper is designed as the rebate fund receiver for the mailings of the shipper. The facilitator may charge the shipper a fee to enroll the shipper into the program. Thus, path B is useful for shippers that do not desire that benefit of instant savings of path A, but do not or cannot maintain the records needed to apply for the rebate themselves, and instead can rely on the facilitator to maintain such records and apply for the rebate when permitted.

In block 109, the shipper obtains one of a postage indicium, a stamp, or other postal indicator of value for a postal item that is to be mailed via the delivery service provider. For example, the shipper may print a postage indicium from their server or computer. The postage indicium may be created by the shipper's server or by the facilitator's server. In any event, the shipper obtains an indicator or postage value and attaches or associates the indicator with the postal item that is to be mailed. The shipper then provides the postal item to the delivery service provider, which in turn processes the item, and delivers the item to the designated recipient.

In block 110, the shipper's account is debited for the postage obtained in block 109. The payment may occur during or subsequent to the operation of block 109. In other words, the account may be debited during obtainment of the indicator, e.g. during creation of the postage indicium. Alternatively, the account may be debited during handling of the postal item by the delivery service provider, e.g. after scanning by the delivery service provider. In any event, the account is debited for the full value of the postage.

Blocks 109 and 110 repeat many times as the shipper sends postal items. As in the A path, the facilitator tracks the postal usage of the shipper. The facilitator can track information on an item by item basis. For example, the facilitator can track the number of items shipped, the postage charged for each item, whether the mail piece qualified as a qualified mail piece, the class of service for each item, destination of each item, etc.

After the time period of the delivery service program, the delivery service provider provides the rebate to the shipper for the items mailed by the shipper, block 111. In order to receive the rebate, the facilitator may have to apply for the rebate on behalf of the shipper. Such application may include the information that the facilitator tracks during the obtainment and payment of postage in blocks 109 and 110.

The process moves to block 114, and returns to diamond 102, where the shipper may then select a desired program.

Path C is entered if the shipper elects not to enter any rebate program, then the process 100 proceeds to block 112. The shipper obtains postage, and their account will be debited accordingly, block 113. The shipper may then return to diamond 202 to select a desired discount program at any time, via block 114. Note that the process may display a screen to the shipper that shows the amount that would have been saved if the shipper had enrolled in the discount program or the rebate program.

Various systems may be used to implement the process 100 of FIG. 1. For example the systems 200, 300 shown in FIG. 2 or 3 may be used. Other systems, not shown, may also be used.

Figure 2:
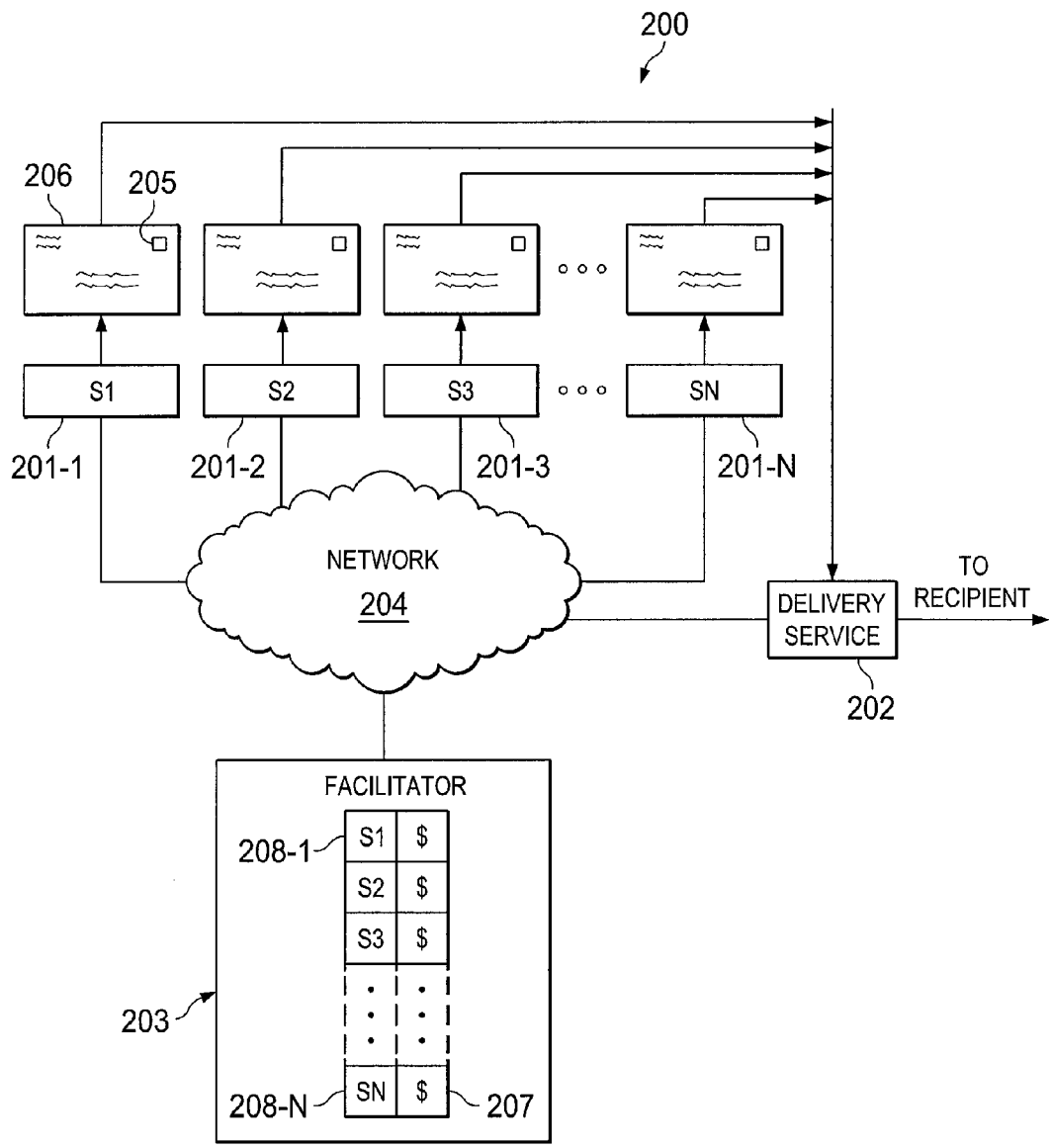
FIG. 2 depicts an example of a system that provides a postage discount to a shipper or user, according to embodiments of the invention using the process of FIG. 1.

FIG. 2 depicts an example of a system 200 that provides a postage discount to a shipper or user. System 200 comprises at least one shipper 201-1, a delivery service provider portion 202, and a facilitator 203 that are in communication with each other through network 204. The system may comprise a plurality of shippers 201-1 to 201-N. System 200 operates to provide the shipper 201-1 a discount for each postal item that is mailed by the delivery service provider 202. Note that it is assumed that the postal items that meet the program requirements are discounted, e.g. if only first class items only are discounted, then third class items would not be discounted. The system 200 takes advantage of a rebate program that is offered by the delivery service provider 202. For example, the delivery service provider 202 may pay a rebate for prior mailings, if the mailings exceed a particular amount over a particular time period. Additionally, or alternatively, the delivery service provider may pay a rebate for prior mailings that qualify as a qualified mail piece. In the system 200, the facilitator 203 offers an immediate discount to the shipper 201-1 based on the expected postage that the shipper will incur over a time period and/or the use of a qualified mail pieces. In one embodiment, the immediate discount offered the shipper by the facilitator 203 is in total, less than the rebate offered by the delivery service provider 202. In other embodiments, the discount may be the same or more than the rebate.

The system 200 operates to allow the user or shipper to obtain postage. The postage may comprise a postage indicium 205 that is printed by the shipper. The indicia 205 may be printed on postage stock that is then attached to the postal items 206, or may be printed directly on the postal items 206. Alternatively, the shipper may purchase or otherwise obtain postage from the facilitator or delivery service provider, e.g. preprinted indicia or stamps. The shipper mails the postal item by handing control of the postal item 206 to the delivery service provider 202. The delivery service provider 202 then processes the postal item 206 for delivery to the recipient designated by the shipper. Note that the postal item may comprise an envelope. The postal item may also comprise other shipping containers such as a package, a box, a carton, a tube, a parcel, a flat, etc.

Payment for the indicia is typically handled by decrementing or debiting a prepaid account of the shipper. Of course, the account may be credit based such that indicia obtained are tracked, and the shipper is billed for the total obtained indicia at a later time. In system 200, the account resides with the facilitator 203 in a vault 207. The vault 207 comprises a plurality of accounts, 208-1 to 208-N, with one account being associated with a respective one of the shippers 201-1 to 201-N. Payment may occur during indicia creation. In this embodiment, payment is made to the delivery service provider during or immediately after the postage indicium is created. Payment may also be made after the postal item with the postage indicium has been mailed. In this example, the postal item will be scanned at some point in the handling by the delivery service provider 202, and then the account will be debited for the cost of delivery. For further information on this embodiment, please refer to U.S. patent Ser. No. 12/553,824 entitled "SYSTEMS AND METHODS FOR PAYMENT OF POSTAGE INDICIA AT OR AFTER POINT OF MAILING," incorporated herein by reference. Payment may occur on an item-by-item basis, or on a periodic basis. For example, a shipper that sends a plurality of items may have their account debited on an hourly basis or a daily basis, e.g. at the close of each business day, for all items scanned during that day.

The shipper 201-1 may be located at home or office. The shipper may also be located in a public location, and comprise a kiosk or other station. Thus, the shipper may use equipment that is located on a street corner or a publicly accessible location, e.g. an airport, a postal facility, a delivery facility, a store, etc. The shipper may have a printer (e.g., a general purpose printer, such as a ink jet or laser printer adapted for general computing use, and/or a special purpose printer, such as a printer specifically adapted to print postage or a printer uniquely adapted to print label stock) to print the postage indicium. The shipper may have a computer that includes software that forms the postage indicia. Alternatively, the software that forms the postage indicia may be located at a computer of the facilitator 203. In any event, the shipper provides the necessary and optional information that is needed to form the postage indicia, which is then printed for use by the shipper or user.

The delivery service provider 202 is the service that receives the postal item from the shipper and delivers it to the desired recipient. The delivery service provider 202 may be a government postal service such as the USPS, or it may be a package delivery service provider such as UPS or FedEx. The delivery service provider 202 may comprise a computer that includes software for validating the postage indicia of the postal item. The computer may also include software to access the account of the shipper, and the computer of the facilitator as needed, e.g. for account management or validation purposes.

The facilitator 203 is an entity that enables the shipper to print postage indicia. Such an entity may be a USPS vendor, such as Stamps.com. The entity may also be an organization that one or both of the shipper and the recipient of the shipper's postal item. For example, the facilitator may be a bulletin board service (e.g. such as CRAIG's LIST), a product seller, or a product distributor that matches a seller of a product (shipper) with a buyer (recipient). For example, the facilitator may post items for sale or items wanted, and then match a product holder (shipper) with a buyer (recipient). As another example, the facilitator may be an auction house that manages one or more auctions of items, and then assists in delivery the item from the seller (shipper) to the bidder (recipient).

Network 204 provides information communication between the shipper 201, the facilitator 203, and the delivery service provider 202. These entities may be disposed locally or remotely with respect to one another. For example, the shipper 201 and the delivery service provider 202 may be disposed locally with respect to each other, and the facilitator 203 may be located remotely from shipper 201 and delivery service provider 202. An example of such an arrangement may be a stand-alone kiosk that allows a shipper to print a postage indicium, and then mail the item associated with the postage indicium. Another example of this type of arrangement, is a delivery service provider store that would allow a user to print a postage indicium, and then mail the item associated with the postage indicium. Note that the shipper 201 and delivery service provider portion 202 may be disposed remotely with respect to each other. Thus, network 204 may comprise the Internet, an intranet, an extranet, a local area network (LAN), a metropolitan area network (MAN), a wide area network (WAN), the public switched telephone network (PSTN), a wireless network, a cable transmission system, a satellite communication network, and/or the like.

With respect to FIG. 1, the shipper 201 communicates with the facilitator 203 via the network 204 to prepay the shipper's account 208, block 101, elect the facilitators discount program, block 102, provide the necessary information to enroll in the program, block 103. The facilitator 203 communicates with the delivery service provider 202, via the network 204, to enroll the shipper in the delivery service provider rebate program, with the rebate being sent to the facilitator, block 104. The shipper then obtains postage, by printing a postage indicium, or otherwise obtaining postage, block 105. The account 208 of the shipper is then debited by the discounted postage rate, block 106, between the postage indicium creation and the delivery of the postal item. The network 204 is used to communicate the debit request to the facilitator from either the shipper (if payment is to be made during indicium creation) or the delivery service provider (if payment is to be made during delivery). After the time period of the rebate program, the delivery service provider, via the network 204, provides the rebate to the facilitator, block 107.

Figure 3:
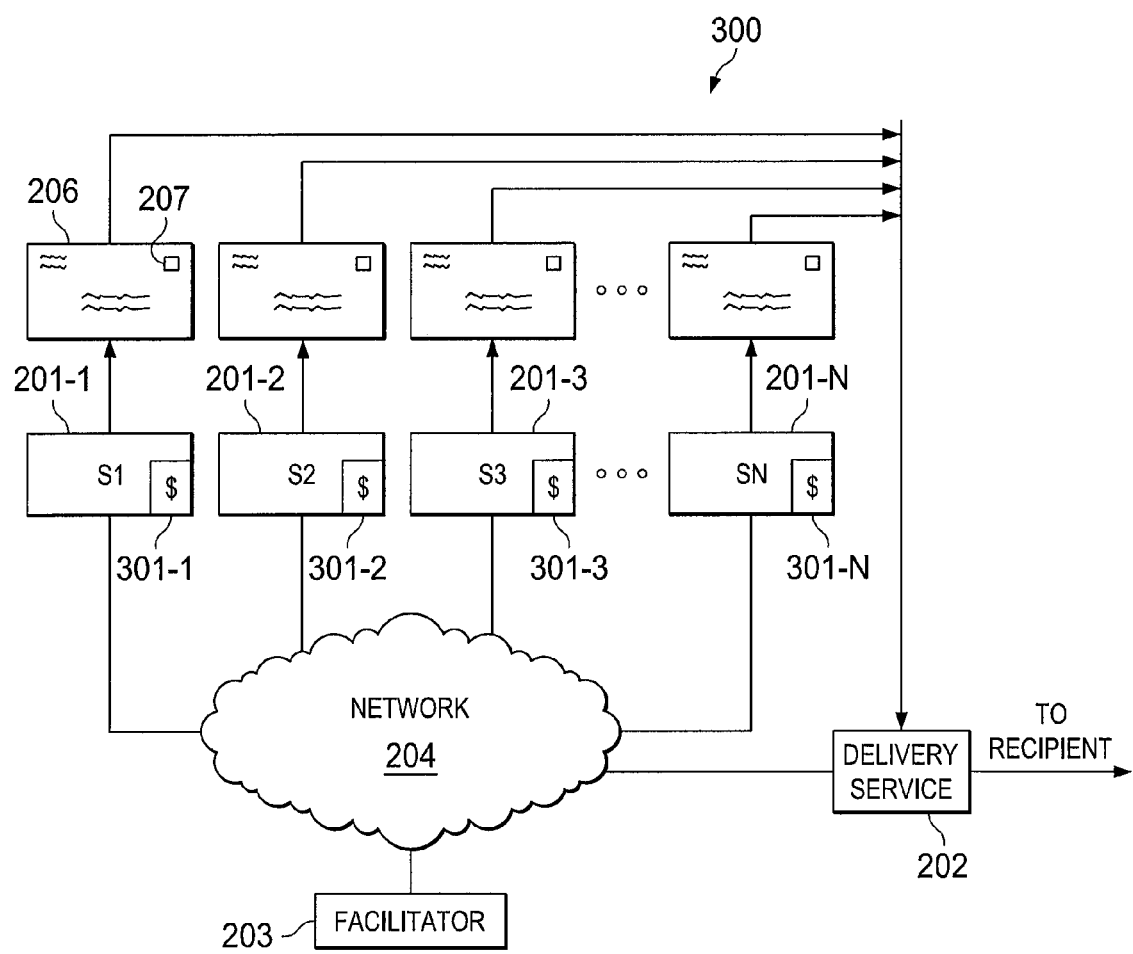
FIG. 3 depicts another example of a system that provides a postage discount to a shipper or user, according to embodiments of the invention, using the process of FIG. 1.

FIG. 3 depicts an example of a system 300 that provides a postage discount to a shipper or user. System 300 is similar to system 200 of FIG. 2, and similar components of system 300 have the same label as their corresponding components of system 200. In system 300, the account 301-1 of the shipper 201-1 resides on computer or meter of the shipper. The other aspects of system 300 operate similarly to system 200. Note that another exemplary system may comprise a hybrid of systems 200 and 300, where some of the shippers have their respective accounts located on their own computers or meters, and other shippers have their respective accounts reside with the facilitator.

Figure 4:
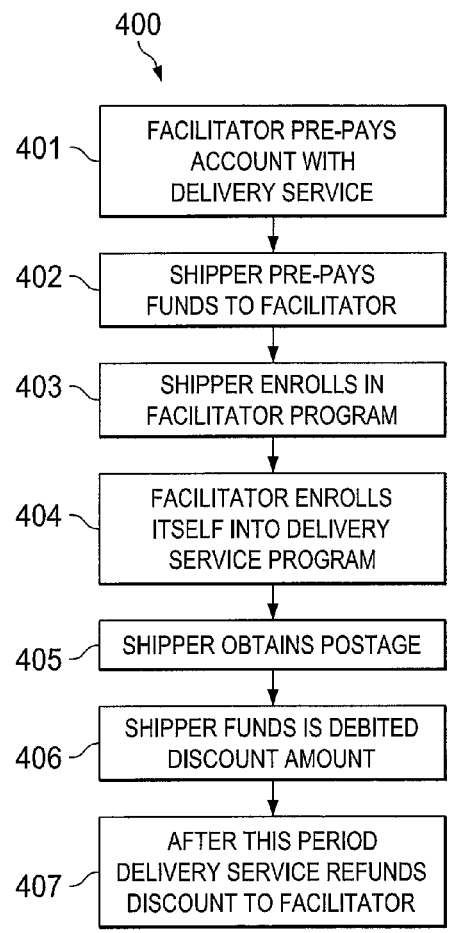
FIG. 4 depicts another exemplary process that provides a discount to a shipper, according to embodiments of the invention.

FIG. 4 depicts another exemplary process 400 that provides a discount to a shipper. This process 400 is similar to process 100 of FIG. 1, and instead of each shipper having a respective trusted account, the facilitator maintains the trusted account with the delivery service provider. The facilitator also has separate records for each shipper. In this method, the facilitator enrolls itself in the rebate program, and offers discounts to the shippers. Thus, in this particular method, the facilitator is able to aggregate the mailings of the shippers 201-1 to 201-N. This method allows the facilitator to offer small value shippers some discount because small shippers that would not otherwise qualify for a rebate may be aggregated together. By using a common account, they could reach the rebate threshold, and thus may be able to receive a discount. The facilitator would maintain records for usage by the shippers, and may allocate the discount according to the usage. If the rebate program is tiered, such aggregation may allow the facilitator to reach the highest rebate tier, and thus offer shippers a larger discount.

Figure 5:
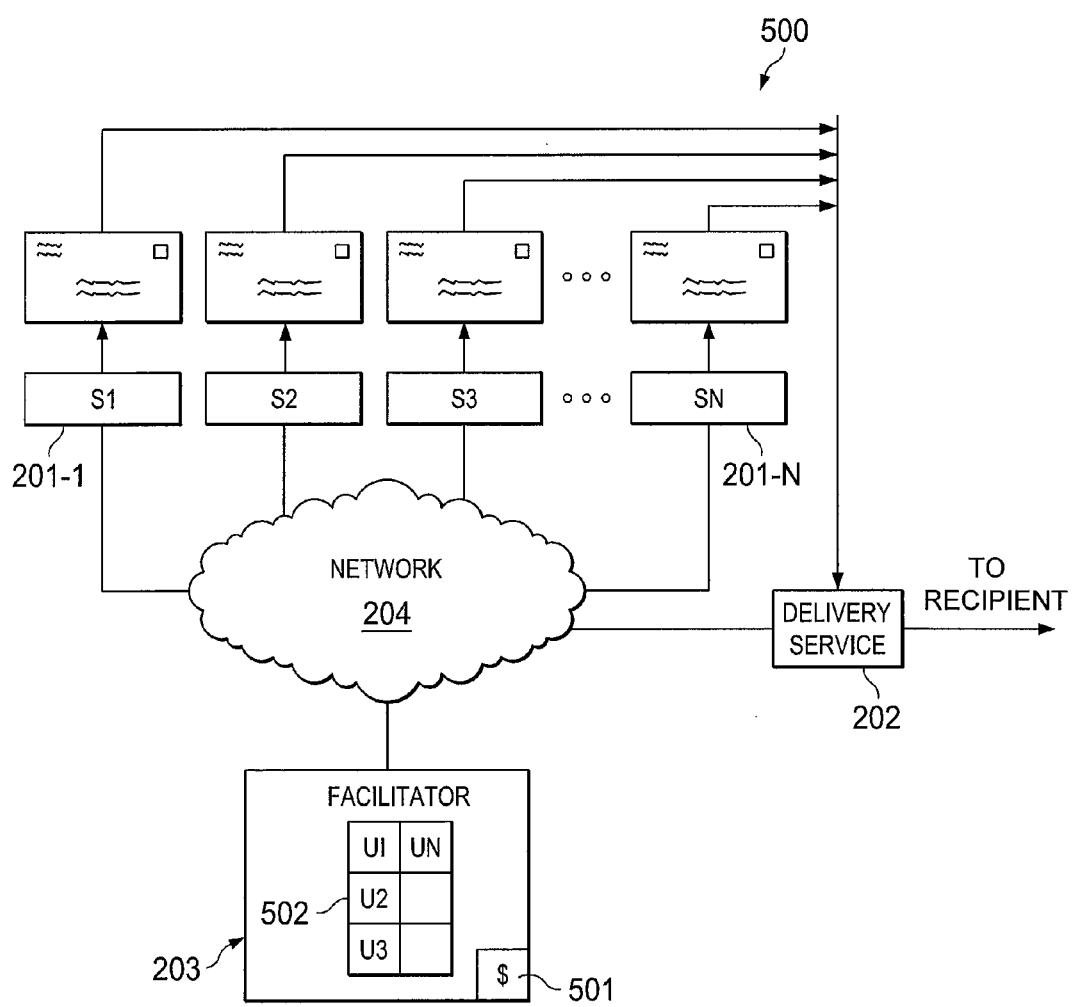
FIG. 5 depicts an example of a system that provides a postage discount to a plurality of shippers or users, according to embodiments of the invention, using process of FIG. 4.

Various system may be used to implement the process 400. For example the system 500 shown in FIG. 5 may be used. Other systems, not shown, may also be used. FIG. 5 depicts an example of a system 500 that provides a postage discount to a shipper or user. System 500 is similar to system 200 of FIG. 2, and similar components of system 500 have the same label as their corresponding components of system 200. In system 500, the facilitator 203 maintains the trusted account 501 with the delivery service provider. The facilitator also has separate records 502 for each shipper. Each shipper may prepay an amount to their respective record, or the record may comprise a credit record, where the shipper is periodically billed for costs accrued. Note that another exemplary system may comprise a hybrid of systems 200, 300, and/or 500, where some of the shippers have their respective accounts located on their own computers or meters, other shippers have their respective accounts reside with the facilitator, and/or the facilitator has an account for still other shippers, or combinations thereof.

Process 400 is discussed with reference to system 500. Again, the process 400 involves interaction between three entities, namely 1) a user or shipper 201; 2) the delivery service provider 202; and 3) the facilitator 203.

In this process 400, the delivery service provider 202 is offering a rebate to the shipper 201. This rebate program is described above with respect to FIG. 1. Also in this process 400, the facilitator 203 is offering a discount program to the shipper 201, as described with respect to FIG. 1. The process 400 begins with block 401, where the facilitator 203 prepays an account 501 with the delivery service provider 202. The account may be maintained on a computer or may comprise a postage meter. In block 402, the shipper either prepays a record with the facilitator or sets up a credit record with the facilitator.

Process 400 assumes that the shipper elects to enter the discount program of the facilitator, and thus the diamond 102, and the (B) and (C) paths of FIG. 1 are not shown. If the shipper elects either the (B) or (C) paths, then process 400 operates similar to that of FIG. 1. Thus, in block 403, the shipper agrees to the terms of the facilitator's program. The terms of this program may be similar to that of process 100. In block 404, the facilitator enrolls itself into the rebate program of the delivery service provider. Note that block 404 may operate earlier in the process, e.g. prior to block 401, along with any of blocks 401-403.

In block 405, the shipper obtains one of a postage indicium, a stamp, or other postal indicator of value for a postal item that is to be mailed via the delivery service provider, as described with respect to process 100. The shipper then provides the postal item to the delivery service provider, which in turn processes the item, and delivers the item to the designated recipient.

In block 406, the facilitator's account 501 is debited for the postage value for mailing the postal item. Again, the debiting may occur during or subsequent to the operation of block 405. In other words, the facilitator's account 501 may be debited during obtainment of the indicator, e.g. during creation of the postage indicium. Alternatively, the facilitator's account 501 may be debited during handling of the postal item by the delivery service provider, e.g. after scanning by the delivery service provider. In any event, the facilitator's account 501 is debited for the full amount of the value of the postage. Also in block 406, the facilitator debits the shipper's record 502 for the discounted value of the postal item mailed.

Blocks 405 and 406 repeat many times as the shipper sends postal items. After the time period of the delivery service provider program, the delivery service provider 202 provides the rebate to the facilitator for the items mailed by the shipper, block 407. As in process 100, the facilitator tracks the postal usage of the shipper. The facilitator can track information on an item by item basis. In order to receive the rebate, the facilitator may have to apply for the rebate, such application may include the information that the facilitator tracks during the obtainment and payment of postage.

Figure 6:
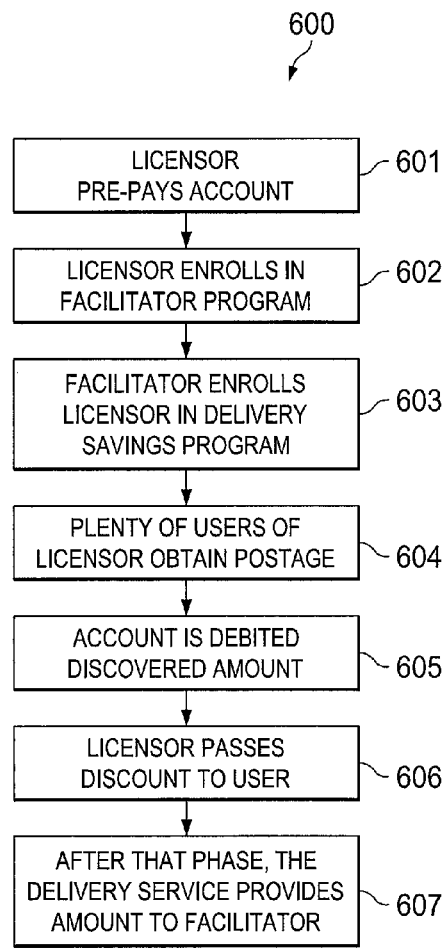
FIG. 6 depicts a further exemplary process that provides a discount to a licensee, according to embodiments of the invention.
Figure 7:
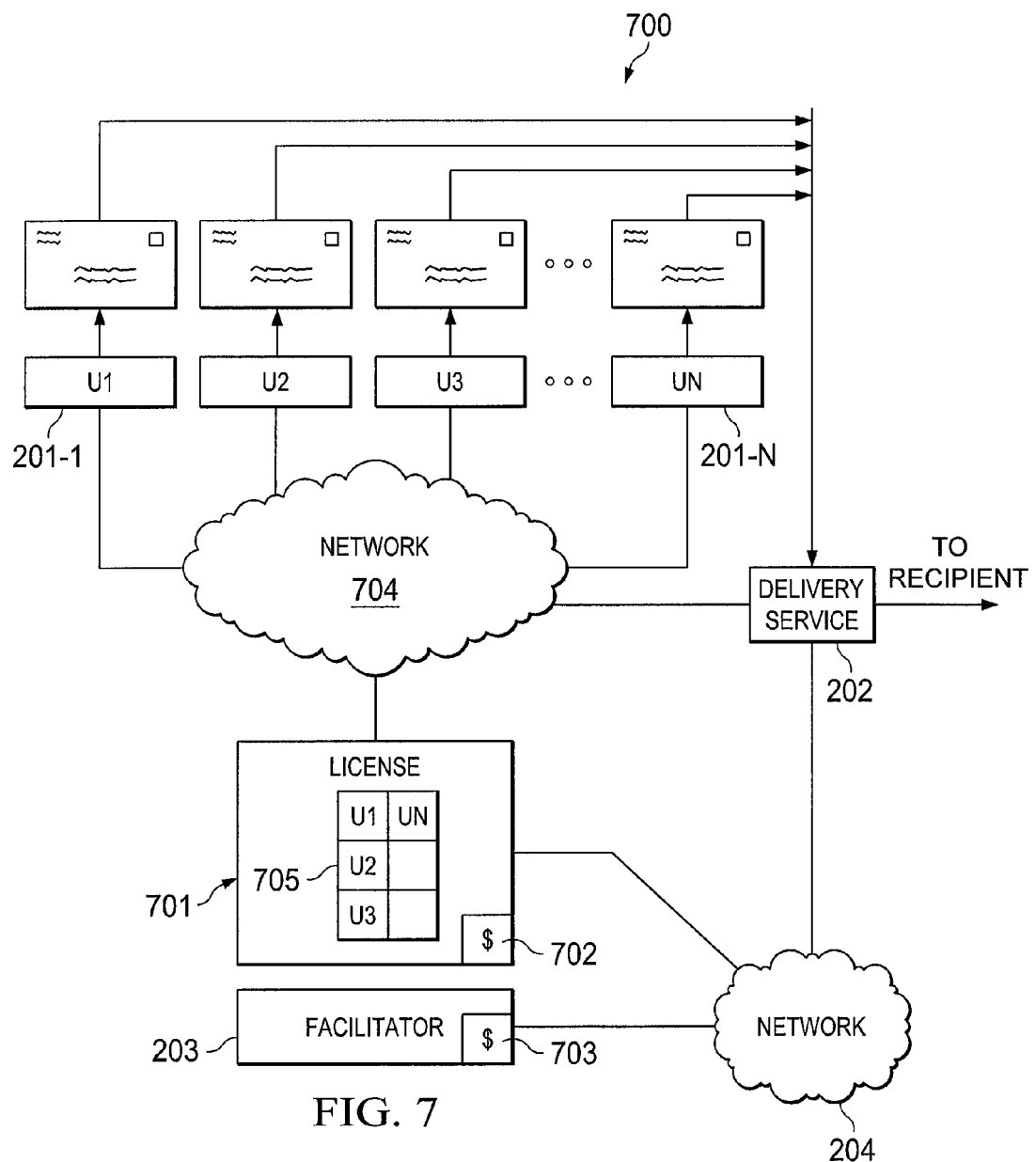
FIG. 7 depicts an example of a system that provides a postage discount to a licensee, according to embodiments of the invention, using process of FIG. 6.

FIG. 6 depicts another exemplary process 600 that provides a discount to a licensee. Various systems may be used to implement the process 600. For example the system 700 shown in FIG. 7 may be used. Other systems, not shown, may also be used. The process 600 is similar to process 100 of FIG. 1, and instead of each shipper interacting directly with the facilitator 203, each shipper interacts with a licensee 701. In this process, the trusted account 703 may reside with the facilitator 203, or the trusted account 702 may reside with the licensee 701. FIG. 7 illustrates both embodiments, but it is understood that the system needs one trusted account, but may have more than one. The licensee 701 also has separate records 705 for each shipper e.g. shipper's records 705. In this method, the facilitator enrolls the licensee 701 in the rebate program, and the facilitator offers discounts to the licensee 701. The licensee may then pass the discounts on to each shipper. Note that network 704 may be network 204 or may be a separate network, which connects the shippers to the licensee. Thus, network 704 may comprise the Internet, an intranet, an extranet, a local area network (LAN), a metropolitan area network (MAN), a wide area network (WAN), the public switched telephone network (PSTN), a wireless network, a cable transmission system, a satellite communication network, and/or the like.

In this process, the licensee may comprise a service organization, e.g. a law firm, and the shippers may be the organization's clients. The licensee may be a bulletin board service (e.g. such as CRAIG's LIST), a product seller, or a product distributor that matches a seller of a product (shipper) with a buyer (recipient). For example, the licensee may posts items for sale or items wanted, and then match a product holder (shipper) with a buyer (recipient). As another example, the licensee may be an auction house that manages one or more auctions of items, and then assists in delivery the item from the seller (shipper) to the bidder (recipient). The licensee may also be a business enterprise, and the shippers may be different departments of the enterprise. Note that the shippers may obtain postage and mail postal items (e.g. the bulletin board or auction house examples) or the licensee may obtain postage and mail postal items on behalf of the shippers (e.g. the corporation or service organization example).

FIG. 7 depicts an example of a system 700 that provides a postage discount to a licensee 701. System 700 is similar to system 200 of FIG. 2, and similar components of system 700 have the same label as their corresponding components of system 200. Each shipper may prepay an amount to their respective record, or the record may comprise a credit record, where the shipper is periodically billed for costs accrued. Note that another exemplary system may comprise a hybrid of systems 200, 300, 500, and/or 700, where some of the shippers have their respective accounts located on their own computers or meters, other shippers have their respective accounts reside with the facilitator, the facilitator has an account for still other shippers, and/or the facilitator interacts with a licensee, or combinations thereof.

The process 600 involves interaction between four entities, namely 1) a user or shipper 201, which is the entity that is mailing a postal item; 2) the delivery service provider 202, which is the entity (e.g. the USPS) that receives the postal item from the shipper and delivers the postal item to a recipient; 3) the facilitator 203, which is the entity (e.g. Stamps.com) that is involved with financial transactions between the licensee and the delivery service provider; and 4) the licensee 701, which communicates with the shippers.

In this process 600, the delivery service provider 202 is offering a rebate to the licensee 701 and/or shipper 201. This rebate program is described above with respect to FIG. 1. Also in this process 600, the facilitator 203 is offering a discount program to the shipper 201 and/or licensee 701, as described with respect to FIG. 1. The process 600 begins with block 601, where the licensee 701 prepays an account 702 and/or 703 with the delivery service provider 202. The account may be maintained on a computer or may comprise a postage meter.

Process 600 assumes that the shipper elects to enter the discount program of the facilitator, and thus the diamond 102, and the (B) and (C) paths of FIG. 1 are not shown. If the shipper elects either the (B) or (C) paths, then process 600 operates similar to that of FIG. 1. Thus, in block 602, the licensee agrees to the terms of the facilitator's program. The terms of this program may be similar to that of process 100. In block 603, the facilitator enrolls the licensee into the rebate program of the delivery service provider, and designates the facilitator to receive the rebate.

In block 604, the shippers of the licensee obtains one of a postage indicium, a stamp, or other postal indicator of value for a postal item that is to be mailed via the delivery service provider, as described with respect to process 100. The shippers then provide their postal items to the delivery service provider, which in turn processes the item, and delivers the item to the designated recipient.

In block 605, the licensee's account 702 and/or 703 is debited for the postage value for mailing the postal item. Again, the debiting may occur during or subsequent to the operation of block 604. In other words, the account may be debited during obtainment of the indicator, e.g. during creation of the postage indicium. Alternatively, the account may be debited during handling of the postal item by the delivery service provider, e.g. after scanning by the delivery service provider. In any event, the account 702 and/or 703 is debited for the discounted value of the postage, as described above with respect to process 100. In block 606, the licensee may optionally debit the shipper's records 502 for the discounted value of the postal item mailed, and thus pass the discount onto the shippers.

Blocks 604 and 605 repeat many times as the shippers send postal items. After the time period of the delivery service program, the delivery service provider 202 provides the rebate to the facilitator for the items mailed by the shipper, block 607.

The facilitator tracks the postal usage of the licensee. The facilitator can track information on an item by item basis. For example, the facilitator can track the number of items shipped, the postage charged for each item, whether the mail piece qualified as a qualified mail piece, the class of service for each item, destination of each item, the number of mail items which never reach their final destination, the reason a mail item never reached its final destination (e.g. insufficient postage, erroneous address, unreadable information, etc.). The tracked information can be analyzed by the facilitator (or another entity e.g. the delivery service provider or a third party) and statistical information can be formulated (e.g. ration comparing deliverable and non-deliverable mail pieces).

In order to receive the rebate, the facilitator may have to apply for the rebate. Such application may include the information that the facilitator tracks during the obtainment and payment of postage. The licensee may track the postal usage of the different shippers via software located with licensee's computer or server, and allocate the discount accordingly. For example, if the licensee is a corporate entity and the shippers are different departments, then the licensee may allocate the discount among the different departments according to usage.

The discount program of the facilitator may involve portions of the processes of FIGS. 1, 4, and 6. For example, for large volume postage usage shippers, the facilitator may offer the portions of the discount program as shown in FIG. 1; for small volume postage usage shippers, the facilitator may offer the portions of discount program as shown in FIG. 4; and for large corporations, service firms, and product intermediaries (e.g. EBAY, Amazon.com, Craig' list), the facilitator may offer the portions of discount program as shown in FIG. 6. The discounts being offered may depend on the portion being used. For example, the process 100 may have better discount rate than the process 400. Thus, different portions of the discount program may have different tiers, with some tiers being available only to certain types of shippers.

The postage indicium 205, shown in the systems 200, 300, 500, and 700, typically comprises a digital indicia, which may be an Information-Based Indicia (IBI). The IBI is a fully (or at least partially) computer-readable mark, e.g. a bar code, which comprises digital signature information which provides security to the postage system and reduces the risks of forgery, meter tampering, and unauthorized use. Another type of IBI indicium is a reduced IBI, which includes less information than a IBI indicium (e.g. the reduced indicium may not include a digital signature and/or other information). In any event, each IBI is substantially unique and may include information such as one or more of a date, a time, a printer registration number, a user number, a source address, a destination address, mailing information (e.g. postage value, class, weight, size of the envelope, and/or number of pages, etc.), an IBI serial number, a digital signature, zip code, tracking information, and special services information (e.g. insurance, return receipt, certified mail, registered, express mail, or other services). In other words, the bar code is typically dynamic in that it is based on information that is specific to postal item, thus each bar code will be different. The bar code may have a Data Matrix format, a two-dimensional bar code format, or a one-dimensional bar code format. The postage indicia may also comprise other elements along with the bar code, for example human readable information, registration marks, and/or orientation marks. The human readable information may be information desired by the USPS or delivery service provider, by the mailer or shipper, and/or by the recipient. Examples of human readable information include a picture, a photograph, a company logo, a watermark, a customized image, a commercial image, a shipper selected image, an advertisement image, multiples thereof, and combinations thereof. Note that substantially unique means that the information is unique in normal use. For example, after a period of years, the information may repeat. However, a user may be confident that the information will identify only one piece of mail at a given time.

Security for the postage indicium may be provided via tokens as described in U.S. patent Ser. No. 12/103,496 entitled "SYSTEMS AND METHODS FOR ACTIVATION OF POSTAGE INDICIA AT POINT OF SALE," filed Apr. 15, 2008, incorporated herein by reference. Other security may be provided by the indicium itself; by the information that is used in its creation, and through verification and authentication by the delivery service provider and/or an approved vendor of the delivery service provider, for example, see U.S. patent Ser. No. 11/323,462, entitled "HIGH SPEED PRINTING," filed Dec. 30, 2005, and U.S. patent Ser. No. 11/323,463, entitled "SYSTEMS AND METHODS FOR SINGLE PASS PRINTING POSTAGE INDICIA," filed Dec. 30, 2005, which are incorporated herein by reference in their entirety.

Figure 8:
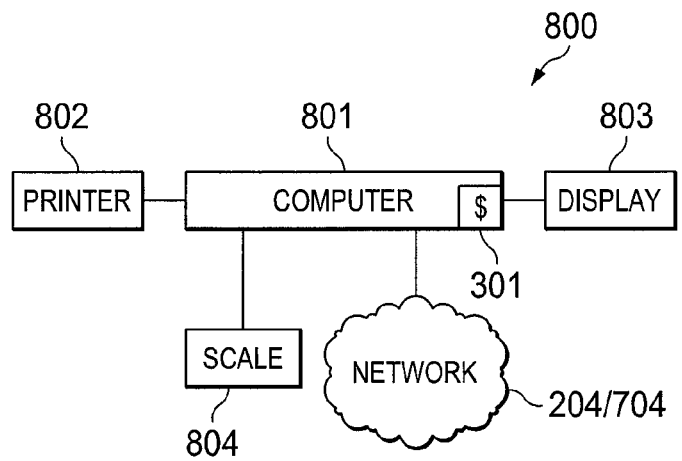
FIG. 8 depicts an example of a system of the shipper, according to embodiments of the invention.

FIG. 8 depicts an example of a system 800 for a shipper. The system includes a computer or server 801, which comprises a processor-based system, such as a computer having a central processing unit (CPU), memory, and appropriate input/output (I/O) devices and interfaces, operable under control of an instruction set defining operation as described herein. For example, computer 801 may comprise a server platform having a processor from the PENTIUM family of processors available from Intel Corporation, Santa Clara, Calif. The system 800 may also comprise a printer 802 (e.g., a general purpose printer, such as a ink jet or laser printer adapted for general computing use, and/or a special purpose printer, such as a printer specifically adapted to print postage or a printer uniquely adapted to print label stock) for printing postage indicia (and/or other information such as a cleansed address and/or an intelligent barcode as described below), a scale 804 that is used to weigh postal items for postage determination, and a display 803 which allows a user to graphically receive information and/or interact with the facilitator and/or the delivery service provider. The computer 801 may include software to allow formation and/or printing of postage indicium (and/or other information such as a cleansed address and/or an intelligent barcode as described below), providing payment to and debiting from account 208/301 or records 207/705. The system 800 communicates via network 204/704.

Figure 9:
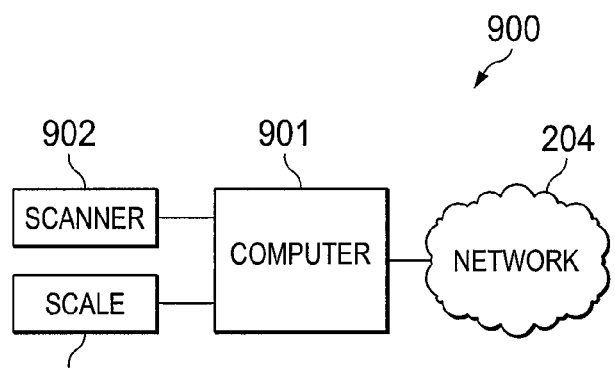
FIG. 9 depicts an example of a system of a delivery service provider, according to embodiments of the invention.

FIG. 9 depicts an example of a system 900 for the delivery service provider 202. The system includes a computer or server 901, which comprises a processor-based system, such as a computer having a central processing unit (CPU), memory, and appropriate input/output (I/O) devices and interfaces, operable under control of an instruction set defining operation as described herein. For example, computer 901 may comprise a server platform having a processor from the PENTIUM family of processors available from Intel Corporation, Santa Clara, Calif. The system 900 may also comprise a scanner 902 for scanning postage indicia during processing of the postal items, and a scale 904 that is used to weigh postal items for postage determination or validation. The computer 801 may include software to allow paying rebates to program participants, receiving account prepayment, account debiting, account validation and management, postage indicia validation. The system 900 communicates via network 204.

Note that the scanner 902 may be located remote from other portions of the system. The scanner may be located adjacent to or in the same facility as the computer 901. The scanner may be a handheld scanner that is operated by a delivery service provider person or agent. The scanner may comprise a scanner that is located in a vehicle operated by a delivery service person or agent. The scanner may be located in a building that is used by the delivery service provider, e.g. a drop-off store, a processing center, or a pickup store. The scanner may comprise a piece of equipment that is used in a processing stream of a processing center. The scanner may be located in the mail slot of a mail box, e.g. a "blue box". The scanner may also be located with the printer, e.g. in a kiosk that prints the indicium. The server 160 may be located remote from the kiosk. The scanner scans the postage indicia 205 of the postal item 206. In embodiments, the scanner can scan the cleansed address and/or the intelligent barcode, which will be described in more detail below. The scanned information is then sent to the server 901. The server 901 then uses the scanned information to identify the account of the shipper and/or validate the postage indicium 205.

The value of the postage indicium, which reflects the cost of mailing the postal item, may be determined by the shipper. The computer 801 may receive various inputs, e.g. weight from a scale (not shown), and data from the shipper, e.g. the recipient address, the shipper address, desired class, desired delivery time, shipper information, etc. and determine the cost of mailing the postal item. The cost may then be expressed on the postage indicia, e.g. encoded into the bar code, or printed as a human readable number of the postage indicia. Alternatively, the cost may be determined by the delivery service provider. The scanner 902 would scan the indicium, the shipper's address, and/or the recipient's address from the postal item. The scale 903 may be used to weight the postal item. The server 901 then determines the cost of mailing the postal item, and debts the account for cost of delivery of the item.

Figure 10:
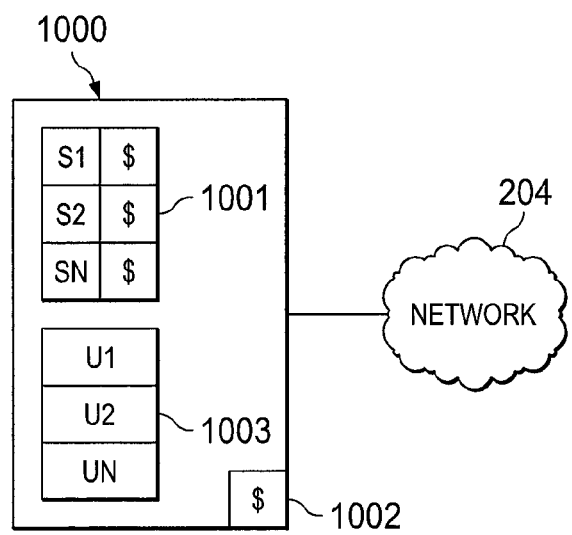
FIG. 10 depicts an example of a system of the facilitator, according to embodiments of the invention.

FIG. 10 depicts an example of a system 1000 for the facilitator 203. The system includes a computer or server 1000, which comprises a processor-based system, such as a computer having a central processing unit (CPU), memory, and appropriate input/output (I/O) devices and interfaces, operable under control of an instruction set defining operation as described herein. For example, computer 1000 may comprise a server platform having a processor from the PENTIUM family of processors available from Intel Corporation, Santa Clara, Calif. The computer may include a plurality of trusted accounts, with each account being associated with one shipper, as shown in system 200. The computer may also comprise a trusted account 1002 that is associated with the facilitator, as shown in system 500, which would also use a plurality of records 1003, with each record being associated with a respective shipper. The computer 1001 may include software to allow receiving rebates from the delivery service provider, debiting discounted postage amounts to shippers, formation of postage indicia, access accounts, manage accounts, etc. The computer 1001 may also comprise software to form the postage indicia and control the printer 106 to print the postage indicia. The computer 1001 may also include other software to monitor the activity of the user, and send information to the user based on the activity. For example, usage reports noting whether the mail piece qualified as a qualified mail piece, the amounts, times, dates, delivery costs, etc. The system 1000 communicates via network 204.

Embodiments of various discount programs will now be described. According to embodiments, the facilitator may offer discount programs, which offer discounts to shippers who meet certain criteria. For example, discounts could be offered to shippers who mail a threshold number of mail items. Additionally or alternatively, discounts could be offered to shippers who obtain a threshold amount of postage value and/or shippers who ship mail pieces that qualify as a qualified mail piece. Of course, the discount programs could be time sensitive. For example, the shipper may be required to ship a threshold number of mail pieces within a set time period (e.g. within one year). Moreover, a discount program could have more than one criteria. For example, the discount program could require that shippers ship a threshold amount of mail pieces and also require that those mail pieces qualify as qualified mail pieces.

Embodiments of the system could create customized rate tables for a shipper or a group of shippers. In developing a customized rate table, embodiments of the system could analyze the usage history of a shipper or a group of shippers, consider the system predicted shipping habits of the shipper or shippers, and/or take into account any promises, guarantees, and/or agreements made by the shipper or shippers and develop a customized rate table that fits the shipper's or group of shippers' needs (e.g. provides the highest discounts possible for those particular mailing habits). For example, if the system determines that a shipper sends many large packages in the months of November and December and many small letters during the rest of the year, the system could develop a customized rate table that offers certain discounts rates on certain mail items in the months of November and December and different discount rates on different mail items during the rest of the year. The rate table customized for a particular shipper or group of shippers could be offered to only that shipper or group of shippers, if desired, since the table is customized for that shipper's shipping habits. Additionally or alternative, a customized rate table could be offered to other shippers or other groups of shippers as well if desired. The customized rate tables could be used to offer discount programs to shippers and could be displayed on a GUI.

In a discount program embodiment based on the amount of mail items shipped, the facilitator could establish one or more thresholds, e.g. 1,000 per month in order to provide confidence the shipper has or will meet the requirements of an underlying rebate program. A facilitator may base a shipper's discounts on having actually achieved a threshold or on the expectation that the shipper will achieve a threshold. For example, if based on prior postal usage history it is determined that the shipper is likely to ship 1,000 mail pieces in a month, the facilitator could offer the shipper a discount program with a discount rate assigned for shippers expected to reach the 1,000 a month shipment threshold. Additionally or alternatively, the facilitator could offer the shipper a discount program that bases discounts for the mailing of qualified mail pieces, which are described in detail below.

Figure 17:
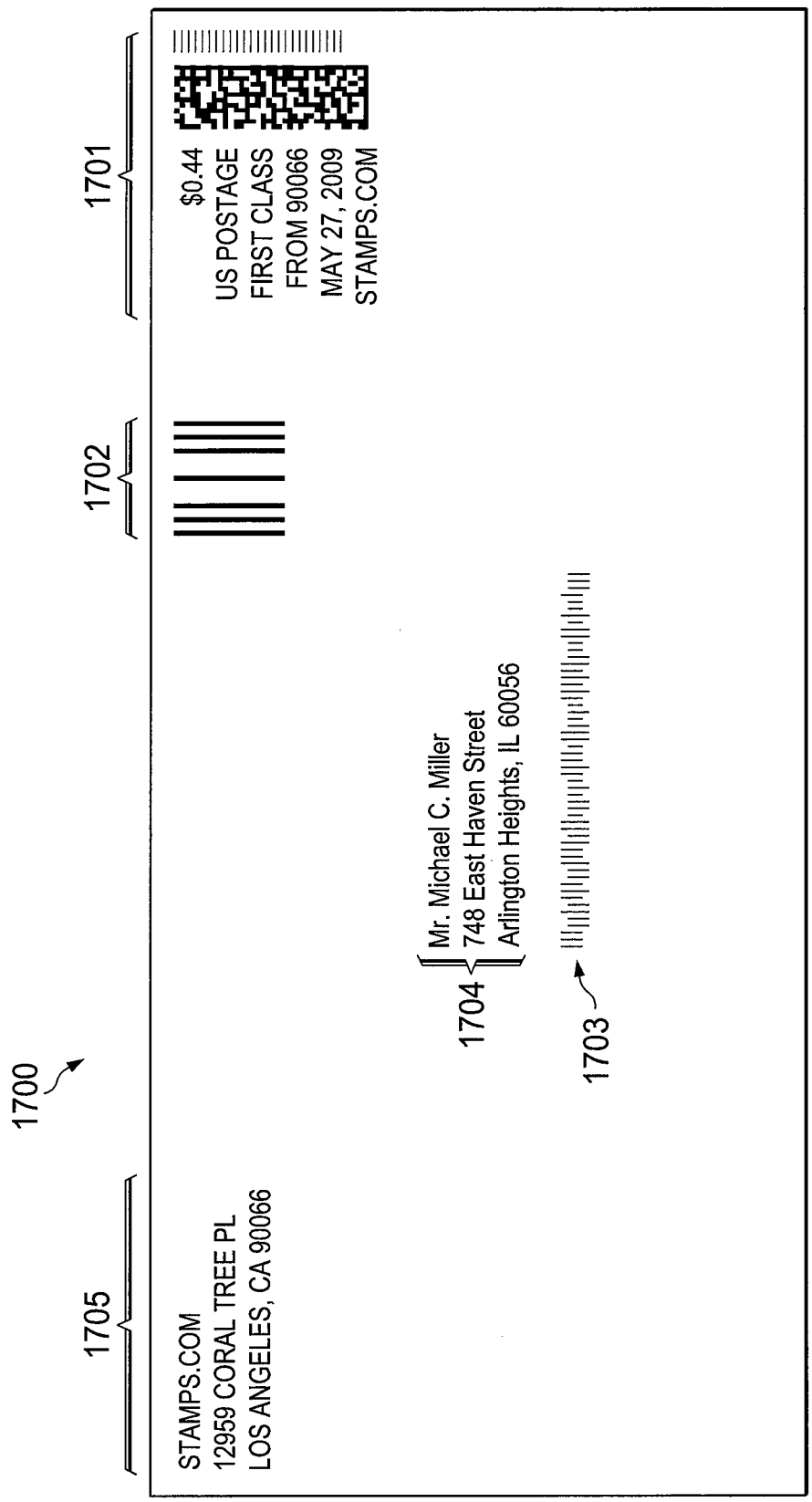
FIG. 17 depicts an embodiment a of qualified mail piece apparatus.

In a discount program based (at least in part) on the shipment of a qualified mail pieces, the mail piece being shipped may be required to meet certain criteria in order to qualify as a qualified mail piece. FIG. 17 shows an example of a qualified mail piece 1700. In this example, the mail item comprises a destination address 1705 and a computer generated (IBI) 1701, as described above. In embodiments, qualified mail piece 1700 could be required to include a facing identification mark (e.g. facing identification mark 1702), which identifies the orientation of the mail piece.

In the example shown in FIG. 17, qualified mail piece 1700 also includes a cleansed address (e.g. cleansed destination address 1704). In embodiments, an addressed can be cleansed by verifying the existence and accuracy of the address against a database of addresses, which are known to exist and be accurate, and correcting any inaccuracies found in the address. According to embodiments, an address is verified and corrected against a verification system (e.g. an address database system). In some embodiments, the accuracy of the database system could be verified and/or certified by the delivery service provider, by the facilitator, and/or by a third party. In embodiments, the address database system could be a Coding Accuracy Support System (CASS)-certified address database system. In embodiments, the facilitator could use its own proprietary CASS-certified software with an AMS (Address Matching System) database to verify and correct addresses and provide the best address match that is possible. The CASS and AMS could be stored on any computer readable medium (e.g. computer flash memory, a hard drive, a diskette, a compact disc, a digital video disc, etc.) and be operable to control a computer system. The CASS system could be updated daily, monthly, etc. to provide the most up to date delivery point for all addresses. In embodiments, the cleansing process could ensure that the address has the proper elements for delivery, including for example, full delivery point information (e.g. street address, suite number (if applicable), city, state, and/or zip code+four). In certain embodiments of the invention, the destination address could be required to be cleansed, as described above. In embodiments, if an address is not be cleansed, then the mail piece could be denied the qualified mail piece designation. Embodiments could prevent the shipper from carrying out an address override. In such an embodiment, the system could prevent a cleansed address from being changed or altered into a non-cleansed address.

In embodiments, qualified mail piece 1700 could also be required to include a substantially unique intelligent mail barcode (IMb) (e.g. 1703), which is an advanced type of barcode that identifies the specific shipper and the specific mail piece. Applying IMb 1703 is more than the mere activity of barcoding. Unlike a POSTNET code (not shown), which only includes the destination zip code+four and can be applied by someone other than the shipper, in certain embodiments, only the shipper can apply a fully-loaded IMb 1703, because it contains information about the shipper and the nature of the mailing. If the delivery service provider were to apply a dummy IMb 1703, it would lack information about the shipper and the nature of the mail piece (e.g. the mail piece number). Essentially, IMb 1703 is an information-rich barcode, which could be placed on qualified mail piece 1700 by a shipper, which contains not only zip code information but also mailer identification information and mail piece-specific identification information. This additional information could allow delivery service quality to be measured, could provide mailers with service information on their mail, and could provide the delivery service provider and/or facilitator with diagnostic tools.

For example, a qualified mail piece comprising IMb 1703 creates a mail piece with a mailing date, which can be used to measure delivery service performance for single mail pieces entering the delivery stream. From the first delivery service provider scan (presumably at the point of origin) to the last delivery or destination scan, and every scan in between, the delivery service provider could have a reliable system for measuring mail processing performance from multiple address points. This could provide highly useful and actionable information to the delivery service provider on potential service performance issues.

Qualified mail pieces are a highly secure product and create sender-identified mail. Each piece of qualified mail could be sender identifiable and fully barcoded, with the code optimally positioned for compatibility with mail processing equipment. Given its high-quality, automation-compatibility, and address-cleansing features, qualified mail pieces could facilitate high service standards and be less costly to the delivery service provider. Moreover, qualified mail pieces are more secure than the traditional form of mail items because users could be made identifiable and could be made to register with a facilitator thereby making the qualified mail pieces traceable to the mailer. Also, compared to meter usage and other forms of payment, the opportunity for fraud is reduced.

Regardless of whether the rebate program and/or discount program is based on the amount of postage purchased, the number of items shipped, the designation of a mail piece as a qualified mail piece, and/or any combination thereof, the rebate program and/or the discount program could be set up to be single tiered or multi-tiered. For example, the rebate program offered by the delivery service provider may be single tiered and the discount program offered by the facilitator may also be single tiered. That is, the delivery service provider may offer a 10% rebate of postage value for postage incurred above $10,000, and the facilitator may offer an immediate discount of 8% of postage value. As another example, the delivery service provider may offer a 10% rebate of postage value for postage incurred above $10,000 per year, and the facilitator may offer a discount of 11% off postage value for postage incurred above $5,000 per year. In embodiments, the discount program (and/or rebate program) may require the postage incurred be associated with a qualified mail piece. Alternatively, the discount program (and/or rebate program) may not require the postage incurred be associated with a qualified mail piece. Discount amounts may vary for each shipper, based upon current usage, projected usage, etc. Further, the discount programs may aggregate users to maximize rebates received from the delivery service provider.

In another example, the discount program offered by the facilitator may be multi-tiered, such that the more the program is used, the greater the rebate, while the delivery service provider rebate program may be single tiered. For example, the delivery service provider may offer a single tier rebate program, with a 10% rebate of postage value for postage incurred above $10,000. The facilitator may offer an immediate discount that is tiered so that the maximum discount is reached when rebate program threshold is met. For example, the facilitator may offer an immediate discount of 2% of postage value for postage incurred below $10,000, and an immediate discount of 8% of postage value for postage incurred above $10,000. In embodiments, the discount program (and/or rebate program) may require the postage incurred be associated with a qualified mail piece. Alternatively, the discount program (and/or rebate program) may not require the postage incurred be associated with a qualified mail piece. Again, discount amounts may vary for each shipper, based upon current usage, projected usage, etc., the discount programs may aggregate users to maximize rebates received from the delivery service provider.

In another example, both programs may be multi-tiered. For example, the delivery service provider may offer a 10% rebate of postage value for postage incurred above $10,000 and a 15% rebate of postage value for postage incurred above $20,000. The facilitator may offer an immediate discount with multi-tiers as well. For example, the facilitator may offer an immediate discount of 2% of postage value for postage incurred below $10,000, a discount of 8% of the postage value for amounts above $10,000 up to $20,000, and a discount of 11% of postage value for postage incurred above $20,000. Note that the discount program of the facilitator may have more, the same, or fewer tiers than the rebate program of the delivery service provider. Note that in this example, the facilitator is offering a discount at a threshold for which there is no rebate, namely below $10,000. This may be done to entice potential shippers to become clients of the facilitator, or for other reasons. In any event, the discount program amount does not have to be tied to the rebate amount. In embodiments, the discount program (and/or rebate program) may require the postage incurred be associated with a qualified mail piece. Alternatively, the discount program (and/or rebate program) may not require the postage incurred be associated with a qualified mail piece. Again, discount amounts may vary for each shipper, based upon current usage, projected usage, etc., the discount programs may aggregate users to maximize rebates received from the delivery service provider.

As another example, the discount program offered by the facilitator may be single tiered, while the rebate program offered the delivery service provider may be multi-tiered. For example, the delivery service provider may offer a 10% rebate of postage value for postage incurred above $10,000 and a 15% rebate of postage value for postage incurred above $20,000. The facilitator may offer a discount of 8% of postage value. In embodiments, the discount program (and/or rebate program) may require the postage incurred be associated with a qualified mail piece. Alternatively, the discount program (and/or rebate program) may not require the postage incurred be associated with a qualified mail piece. Again, discount amounts may vary for each shipper, based upon current usage, projected usage, etc., the discount programs may aggregate users to maximize rebates received from the delivery service provider.

In examples, the rebate program may be based on different metrics than the discount program. For example, the rebate program may be based on the number of mail pieces shipped while the discount program is based on the amount of postage value purchased. In embodiments, the discount program (and/or rebate program) may require the use of qualified mail pieces. Alternatively, the discount program (and/or rebate program) may not require the use of qualified mail pieces.

For each of the examples described above, it is useful to display information that allows a shipper to see how many items or how much postage value needs to be accrued to reach the next discount tier. For example, as shown in FIGS. 11 and 12, software may display various types of information 1100 to the shipper, on an interactive graphic user interface (GUI) 803 in the shipper system 800. The information may include the number of items shipped, the postal costs of the items, the number of qualified mail pieces shipped, and the amount received in discounts from the facilitator. Other information that may be shown includes dates and times of scanning by the delivery service provider, dates and times of receipt of the item by the recipient, other tracking information, etc. The information may also show the predicted amount saved if the next tier is reached. Such information allows shippers to maximize their discount. In the case of a program comprising an aggregation of users, embodiments may display the aggregate group's usage and predictions. Alternatively, embodiments may prevent shippers in an aggregate group program from viewing some or all of the usage information of a different shipper in the group for security and/or privacy reasons.

Shippers such as medium sized or larger corporations may mail items from multiple departments or business units. Tracking the items shipped by the departments of business units would allow the shipper to allocate the discount or rebate savings to the particular department. As stated earlier, postal information about the mailed items may be maintained by the facilitator or by the licensee. Such a process is described in FIG. 6 and such a system is shown in FIG. 7. Software located at the corporation, e.g. 701 or with the facilitator, e.g. 203, may track mailings by department or unit. Information such as information 1300 of FIG. 13 may be displayed to the shipper or licensee. The information may also detail other metrics on a department or unit basis, e.g. number of items mailed, postal costs for a time period, costs per item, the amount of qualified mail pieces shipped, etc. The facilitator can also either divide the discount or rebates by department or unit, or provide information which allows the licensee to divide the discount or rebates by department or unit.

Similarly, service provider shippers such as law firms, accounting firms, etc. may mail items on behalf of particular clients. Tracking the items chargeable to particular clients would allow the shipper to allocate the discount or rebate savings back to the particular clients. As stated earlier, postal information about the mailed items may be maintained by the facilitator or by the licensee. Such a process is described in FIG. 6 and such a system is shown in FIG. 7. Software located at the corporation, e.g. 701 or with the facilitator 203, may track mailings made for each client. Information such as information 1400 of FIG. 14 may be displayed to the shipper or licensee. The information may also detail other metrics on a client basis, e.g. number of items mailed, postal costs for a time period, costs per item, etc. The facilitator can also either divide the discount or rebates by client, or provide information which allows the licensee to divide the discount or rebates by client.

Figure 15:
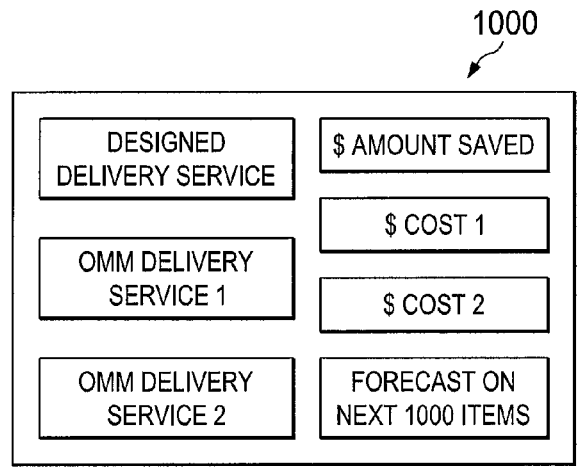
FIG. 15 depicts a still further example of information displayed to a shipper, according to embodiments of the invention.

Other types of information may be displayed to a shipper. For example, information comparing the costs of mailing with the current or designated delivery service provider with other delivery service providers may be provided to the user. This allows a shipper to see comparative rates between different delivery service providers and make mailing decisions accordingly. The system could be interactive and forecast usage and savings. For example, the shipper could see if mailing an additional item with the designated delivery service provider would cause the shipper to receive a better discount (or prevent losing a discount), or if mailing the item is cheaper for the shipper to mail by a different delivery service provider. Other forecasting, that is possible with embodiments, provide forecasts that aid in the formulation of future mailing strategies. For example, the software may provide a savings forecast if the next 1000 packages were to be mailed with the designated delivery service provider at a certain time. It may also provide a cost forecast if the next 1000 packages were to be mailed with a different delivery service provider at the same or a different time. Additionally or alternatively, forecasts could take timing into consideration and inform the shipper, for example, that if a certain number of shipments were delayed a few days or months, an overall cost savings may be realized. This would allow a shipper to make more informed choices. Such forecasts may take into account the current discount tier and/or future discount tiers. For additional information on a multi-carrier rate shopping system, please refer to U.S. patent Ser. No. 11/353,690 entitled "SYSTEM AND METHOD FOR VALIDATING POSTAGE," filed Feb. 14, 2006. Information such as information 1500 of FIG. 15 may be displayed to the shipper.

In some embodiments, selecting the facilitator's discount program may require that the shipper enter into a contract with the facilitator, wherein the shipper agrees to use the specified delivery service provider for at least as long as the time period of the delivery service provider retroactive rebate program, and/or to ship postal items costing a certain postage value (e.g. the value to trigger the delivery service provider retroactive rebate). If the shipper changes delivery service provider or does not incur the certain postage value, then the shipper may be require to refund all or part of the immediate discounts that they have received. This will reduce the risk of the facilitator in providing the immediate rebate to the shipper.

Note that any of the functions described herein may be implemented in hardware, software, and/or firmware, and/or any combination thereof. When implemented in software, the elements of the present invention are essentially the code segments to perform the necessary tasks. The program or code segments can be stored in a processor readable medium. The "processor readable medium" may include any medium that can store or transfer information. Examples of the processor readable medium include an electronic circuit, a semiconductor memory device, a ROM, a flash memory, an erasable ROM (EROM), a floppy diskette, a compact disk CD-ROM, an optical disk, a hard disk, a fiber optic medium, etc. The code segments may be downloaded via computer networks such as the Internet, Intranet, etc.

Figure 16:
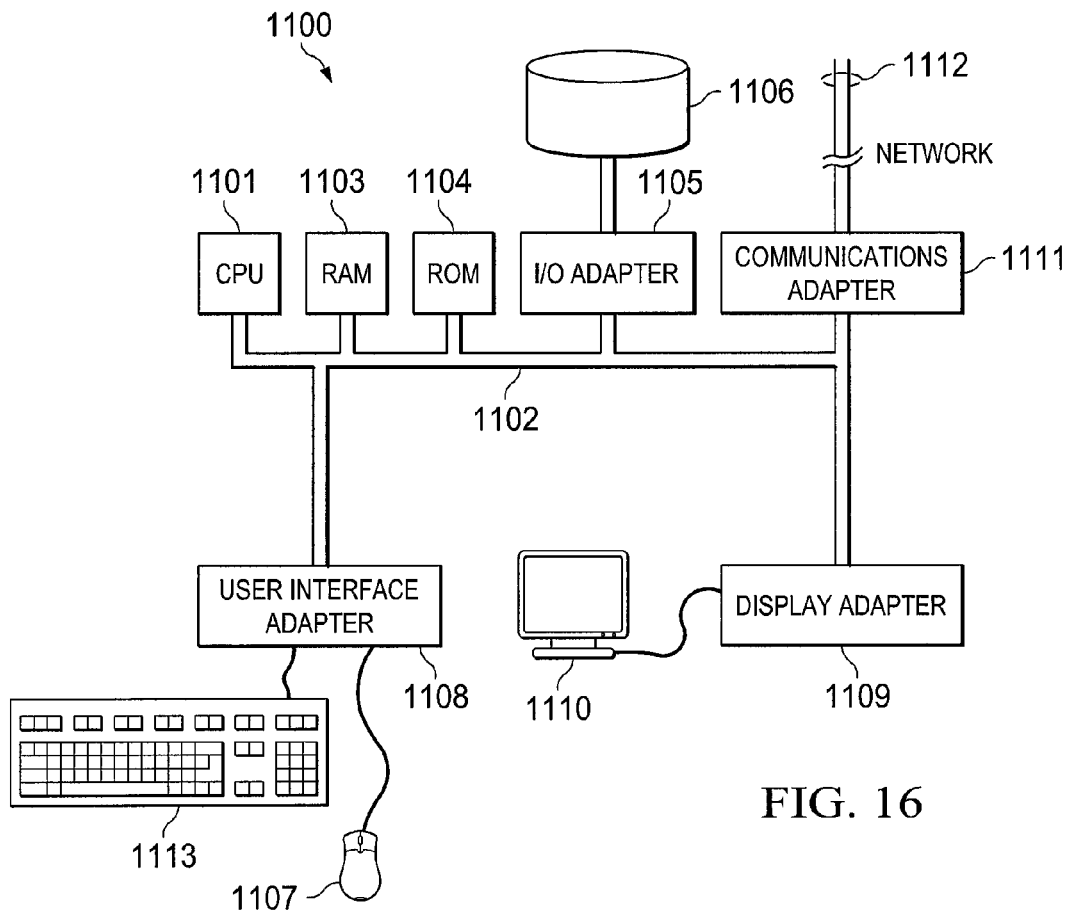
FIG. 16 depicts a block diagram of a computer system which is adapted to use the present invention.

FIG. 16 illustrates computer system 1600 adapted to use the present invention. Such a system may be used as servers 801, 901, 1001. Central processing unit (CPU) 1601 is coupled to system bus 1602. The CPU 1601 may be any general purpose CPU, such as an Intel Pentium processor. However, the present invention is not restricted by the architecture of CPU 1601 as long as CPU 1601 supports the inventive operations as described herein. Bus 1602 is coupled to random access memory (RAM) 1603, which may be SRAM, DRAM, or SDRAM. ROM 1604 is also coupled to bus 1602, which may be PROM, EPROM, or EEPROM. RAM 1603 and ROM 1604 hold user and system data and programs as is well known in the art.

Bus 1602 is also coupled to input/output (I/O) controller card 1605, communications adapter card 1611, user interface card 1608, and display card 1609. The I/O adapter card 1605 connects to storage devices 1606, such as one or more of a hard drive, a CD drive, a floppy disk drive, a tape drive, to the computer system. The I/O adapter 1605 is also connected to a printer, which would allow the system to print paper copies of information such as document, photographs, articles, etc. Note that the printer may be a printer (e.g. inkjet, laser, etc.), a fax machine, or a copier machine. The printer may serve as printer 802. Communications card 1611 is adapted to couple the computer system 1600 to a network 1612, which may be one or more of a telephone network, a local (LAN) and/or a wide-area (WAN) network, an Ethernet network, and/or the Internet network. Network 1612 may be network 204 and/or 704. User interface card 1608 couples user input devices, such as keyboard 1613, pointing device 1607, and microphone (not shown), to the computer system 1600. User interface card 1608 also provides sound output to a user via speaker(s) (not shown). The display card 1609 is driven by CPU 1601 to control the display on display device 1160. Display device 1160 may be display 803.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
   tracking, by a computer processor of a facilitator, purchasing habits of a plurality of shippers, wherein said purchasing habits of said plurality of shippers are below a threshold required for said plurality of shippers to qualify for a rebate program of a delivery service provider;
   providing, by said facilitator to a shipper of said plurality of shippers, a discounted postage rate on a postage indicium, wherein said discounted postage rate is a postage rate that costs less than a normal postage rate charged by said delivery service provider to a majority of other shippers, wherein said providing provides said discounted postage rate to said shipper while said purchasing habits of said shipper are below said threshold required to qualify for said rebate program;
   tracking, by a computer processor, postage usage information associated with said plurality of shippers;
   aggregating said postage usage information of said plurality of shippers and with said aggregated postage usage information, applying for a rebate from said delivery service provider, wherein said applying is conducted by said facilitator; and
   receiving, by said facilitator, said rebate from said delivery service provider.

2. The method of claim 1 wherein said discount rate is provided to said shipper before said rebate is received by said facilitator.

3. The method of claim 1, further comprising:
   charging an account, associated with said shipper, said discounted rate for said postage indicium obtained by said shipper.

4. The method of claim 3, wherein charging said account comprises:
   debiting said account for said normal rate for said postage indicium; and
   crediting said account for said difference between said normal rate and said discount rate before said facilitator receives said rebate.

5. The method of claim 4, wherein said crediting occurs immediately after said debiting.

6. The method of claim 1 further comprising:
   enrolling said shipper in a discount program of said facilitator; and
   enrolling said shipper in a rebate program of said delivery service provider such that said facilitator receives said rebate from said delivery service provider.

7. The method of claim 6 wherein said discount program provides said discount postage rate to said shipper after said shipper ships a threshold amount of mail pieces.

8. The method of claim 6 wherein said discount program provides said discount postage rate to said shipper after said shipper obtains a threshold amount of postage value.

9. The method of claim 6 wherein said discount program provides said discount postage rate to said shipper when said shipper ships a mail piece having a cleansed address.

10. The method of claim 1 further comprising:
    reviewing said purchasing habits of a plurality of shippers to forecast whether any one of said plurality of shippers are a qualifying shipper, wherein a qualifying shipper is any one of said plurality of shippers that is forecasted to reach said threshold required to qualify for said rebate program; and
    offering to said qualifying shipper participation in a discount program based on said reviewing.

11. The method of claim 10 further comprising:
    providing, to said qualifying shipper, displayable information based on said purchasing habits of said qualified shipper, wherein said providing said displayable information provides a forecast of an aggregate savings for items to be mailed based on said offered discount program.

12. The method of claim 1, further comprising:
    providing, to said shipper, displayable information based on said usage information associated with said postage indicium.

13. The method of claim 12, wherein said postage indicium is one of a plurality of postage indicia obtained by said shipper, and said method operates on each of said plurality of postage indicia, wherein said providing said displayable information provides information on an aggregate savings from all postage indicia obtained at said discounted postage rate.

14. The method of claim 12, wherein said postage indicium is one of a plurality of postage indicia obtained by said shipper, and said method operates on each of said plurality of postage indicia, wherein said providing said displayable information provides a forecast of an aggregate savings for additional items to be mailed based on said discounted postage rate.

15. The method of claim 12, wherein said postage indicium is one of a plurality of postage indicia obtained by said shipper, and said method operates on each of said plurality of postage indicia, wherein said providing said displayable information provides at least one of a forecast of a number of additional items that must be mailed to achieve a higher discount rate and a forecast of an aggregate savings for additional items to be mailed based on said higher discount rate.

16. The method of claim 1, further comprising:
assigning, by said facilitator, said discounted postage rate to each shipper of a plurality of shippers, wherein at least one shipper of said plurality of shippers has a different discounted postage rate than another shipper of said plurality of shippers.

17. The method of claim 1, further comprising:
establishing, by said facilitator, an account with said delivery service provider for maintaining funds for postage; and
establishing a plurality of records, wherein each respective record is associated with each respective shipper of a plurality of shippers, and wherein each said respective record maintain funds of each said respective shipper.

18. The method of claim 17, wherein said providing comprises:
charging said account said normal rate for each said postage indicium provided to each said respective shipper of said plurality of shippers; and
charging said respective record associated with said respective shipper said discounted postage rate for said postage indicium provided to said respective shipper.

19. The method of claim 1, wherein said comprises:
creating a customized discount program for said shipper, wherein said customized discount program defines said discounted postage rate, and wherein said customized discount program is based at least in part on said purchasing habits of said shipper.

* * * * *

UNITED STATES PATENT AND TRADEMARK OFFICE
CERTIFICATE OF CORRECTION

| | | |
|---|---|---|
| PATENT NO. | : 8,768,858 B1 | Page 1 of 1 |
| APPLICATION NO. | : 12/651320 | |
| DATED | : July 1, 2014 | |
| INVENTOR(S) | : Begen | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 856 days.

Signed and Sealed this
Ninth Day of February, 2016

Michelle K. Lee
*Director of the United States Patent and Trademark Office*